United States Patent [19]

Mickelsen et al.

[11] 4,337,727
[45] Jul. 6, 1982

[54] MODULAR CAGE SYSTEM FOR UNDERWATER USE

[76] Inventors: Roger W. Mickelsen, 132 W. 255 South; Rex C. Infanger, 595 N. 900 West, both of Orem, Utah 84057; Richard A. Heckman, 603 E. 4300 North, Provo, Utah 84601

[21] Appl. No.: 165,493

[22] Filed: Jul. 3, 1980

[51] Int. Cl.³ .................................... A01K 61/00
[52] U.S. Cl. ......................................... 119/2; 119/3
[58] Field of Search ............... 119/2, 3, 4; 285/137 R; 138/112, 113, 114, 115

[56] References Cited

U.S. PATENT DOCUMENTS

| | | | |
|---|---|---|---|
| 1,795,884 | 3/1931 | Parker | 138/112 |
| 3,086,629 | 4/1963 | Blitzer | 189/82 |
| 3,815,546 | 6/1974 | Plante | 119/2 |
| 4,007,709 | 2/1977 | Wishner | 119/2 |
| 4,198,924 | 4/1980 | Chapman | 119/2 |

OTHER PUBLICATIONS

R. W. Mickelsen, R. C. Infanger, and R. A. Heckman; "Culturing the American Lobster Using a Vertical Stacked Cage System," Proceedings of the Ninth Annual Meeting World Mariculture Society, 723-730, (Published by Louisiana State University, Division of Continuing Education, 1978).

Primary Examiner—Hugh R. Chamblee
Attorney, Agent, or Firm—Thorpe, North & Western

[57] ABSTRACT

A vertical housing and feeding structure for raising mariculture and other underwater animals. Tiers of feeding tubes, each of a successively longer length, form a backbone structure to which cages may be selectively connected. Each cage is connected along a vertical front face of the backbone structure so that one of the feeding tubes terminates at a point accessible from within the cage. A feed opening just above this termination point directs food material dropped through the feeding tube to either fall within the cage or be accessible from therewithin so that it may be consumed by the caged animal. All of the feeding tubes of each tier have a top open end that is positioned near the surface of the water to facilitate the controlled delivery of food to each individual cage. Two sets of backbone structure may be joined back-to-back so that cages may be connected to both sides of the structure, thereby doubling the cage capacity of the system. The capacity of the backbone structure may also be augmented by increasing the width of the tiers of feeding tubes or by adding additional tiers of feeding tubes to the back of each backbone structure, each additional tier being of a successively longer length. Either method thus increases the frontal area of the backbone structure and provides additional frontal space to which additional cages may be attached. Inspection of the cages is facilitated by hoisting the entire backbone structure, including the cages attached thereto, out of the water. The walls of the cages are screened with a sufficiently large mesh to allow oxygenated water to freely circulate therethrough and to further allow fecal material and uneaten food to fall out of the cage without accummulation.

15 Claims, 11 Drawing Figures

MODULAR CAGE SYSTEM FOR UNDERWATER USE

BACKGROUND OF THE INVENTION

This invention relates to a system and structure for the individual housing and raising of underwater animals and mariculture; and more particularly to an expandable vertical housing and feeding structure adapted for the optimum use of underwater cage space, and further providing individual control over the amount of food delivered to each cage. While the structure of the invention herein disclosed has been especially designed for the growing of lobsters, it is adaptable to be used with many forms of underwater animal life, including all species of mariculture. Therefore, the term "animal" or "animals", as used in this application, will refer to most species of mariculture and other underwater life.

The prior art reveals numerous approaches devised for housing and feeding underwater animals. These prior art devices have resulted in large part from the high demand for such animals—whether as food for human consumption or as bait. Because of this high demand, and because underwater animals usually require very little space in which to grow, the raising of such animals lends itselve to a high density type of cage system.

Illustrative of the prior art structures used for raising underwater animals are the following patents: Wishner, U.S. Pat. No. 4,007,709 (1977); Serfling, U.S. Pat. No. 3,916,833 (1975); and Plante, U.S. Pat. No. 3,815,546 (1974). These prior art caged systems are characterized in general by a vertical stacking of individual cages.

All of the prior art underwater caged systems with which the inventors of this application are familiar suffer from one or more of the following problems. First, the caged structures must often support the weight of the cage, the water inside of the cage, and the animal. This often results in a needlessly bulky, strong, and expensive structure. Secondly, the prior art caged systems are not designed to allow a controlled feeding to be easily performed from above the surface of the water to the individual cages below the water. Moreover, even if a controlled, individualized, feeding system is provided, the entrapment of smaller animals and other debris can easily plug up the feeding mechanism.

Thirdly, prior art caged structures are often difficult to inspect for dead animals and for the accumulation of uneaten food and fecal material. Fourthly, the prior art systems provide no easy method for the removal of such undesirable accumulations. Furthermore, if a method is provided to prevent the accumulation of uneaten food and fecal material, then this same method often allows only partially eaten food to fall out of the cage, thereby causing waste.

Fifthly, prior art caged structures are often limited in size, as well as to the number of cages that can be used, thereby limiting the number of animals that can be housed without the procurement of a whole new system. Sixthly, the natural flow of oxygenated water through the system is often restricted, thereby causing the use of a forced oxygenated system which can be expensive both in manufacturing and operating costs.

Lastly, the prior art caged systems require that animals, as they grow, be physically moved from smaller cages to larger cages so as to prevent stunting of their growth.

SUMMARY OF THE INVENTION

In light of the problems associated with prior art underwater caged systems, a principle object of the present invention is to provide a vertical modular cage system for underwater use that is readily expandable both in depth and width so that additional cages can be added thereto without limitation.

A further object of the present invention is to provide a modular cage system unit that allows above-water, controlled, individualized feeding of the animals in the underwater cages without having to raise the cages or their support structure out of the water.

A still further object of the present invention is to provide a modular caged system for underwater use wherein the individual cages can be readily detached from the system's support structure without disturbing the other cages that form part of the system.

Another object of the present invention is to provide an underwater caged system that utilizes light-weight, inexpensive, column support structure that supports the weight of the cages and animals therein both in and out of the water.

Still another object of the present invention is to provide an underwater modular cage system that allows easy and effective inspection of the cages for dead animals and undesired accumulation of fecal material and other debris.

It is also an object of the present invention to provide an underwater modular cage system that allows oxygenated water to freely pass, without external force, unrestricted through the system in a desirable flow pattern.

It is still another object of the present invention to provide such a modular cage system that allows fecal material and uneaten food to fall out of the individual cages without accumulation.

It is still a further object of the present invention to provide modular cage system for underwater use that can be used to house animals of a wide variety of sizes, from small to large.

Another object of the invention herein disclosed is to provide a underwater modular cage system that prevents the wasting of food.

A further object of the present invention is to provide a modular cage system for underwater use that provides easily adjustable cage sizes, thereby allowing the optimum use of available space while preventing the stunting of growth.

An additional object of the present invention is to provide such a modular cage system that prevents smaller animal entrapment within the feeding mechanism used to direct the controlled, individualized food to each cage.

It is also an object of the present invention to provide an underwater modular cage system that can be used to house a wide variety of mariculture and other underwater species, not being restricted to solely lobsters or any other single animal type.

The above and other objects of the present invention are realized in a vertically stacked modular cage system that includes a vertical backbone structure to which individual cages may be selectively attached. The backbone structure consists of at least two tiers of feeding tubes bound together with one tier being vertically longer than the other. A front face of each tier of feeding tubes is adapted to allow individual cages to be detachably connected thereto. The front face of the longer tier of feeding tubes is that portion that protrudes below the shorter tier of feeding tubes and which is accessible from the same side on which the shorter tier of feeding tubes is located. Succesively longer tiers of feeding tubes can be added to the backbone structure so as to increase the frontal space to which the cages may be attached, with each successively longer tier providing additional frontal space that protrudes below the preceeding tier of feeding tubes. Also, each tier of feeding tubes may be increased in width by adding additional tubes thereto, thus also increasing the frontal space to which additional cages may be attached.

In accordance with one application of the invention, two sets of backbone structure can be joined back to back so as to provide frontal space that is accessible from both sides of the joined structure, thereby effectively doubling the number of cages that can be utilized.

The individual tubes of each tier are tied together, typically in parallel fashion, so that their open top ends are substantially even with each other. Each tube also includes an opening along a front face thereof through which food, periodically deposited in the open top end, may be directed into, or accessible from, the individual cages that are selectively attached to the front face of the tiers.

The individual cages are adapted to be detachably connected to the front side of the tiers of feeding tubes so that at least one of the feed openings of one of the tubes is accessible from within each cage. The cages themselves consist of a box like structure that is open on one side. At least the top, bottom, and two sides of the cage are enclosed with a mesh screen through which oxygenated water may freely flow. The open end of the cage is adapted to be placed against the front face of the tiers of feeding tubes. Fingers or ridges protrude from the edges of the open side of the cage which can be forceably inserted in groves or slots located along the front face of the tiers of feeding tubes. Cages can thus be positioned at any desirable location along a front face of a given tier, the tier itself serving as the wall of the cage that closes in the open side. A handle may be provided at the side opposite the open side of the cage to facilitate the inserting and removing of the cages from the tiers. The cages are also designed so that they can be subdivided into individual compartments, thereby allowing the size of a given cage to increase (as an animal grows) by merely removing partitions within the cage.

In operation, the backbone structure is hoisted vertically above the water and the cages are detachably connected at desired locations. The entire structure (backbone and cages) are then lowered to a desired depth beneath the water, with the open top ends of the tubes of each tier being held above or near the surface of the water. At least one tube will have a feed opening directed to each cage or compartment thereof; thus, feeding is accomplished merely by dropping food, typically in pellet form, through the open top ends of the tubes which have openings directed to the cages in which the animals to be fed are located. Inspection of the entire structure can be easily done by merely hoisting the entire unit above the water and making the necessary visual inspections. At the same time that inspections are made, any modifications to the cage structure can be easily made by rearranging the cages and/or by adding additional cages.

BRIEF DESCRIPTION OF THE DRAWINGS

The above and other objects, features, and advantages of the invention will be more apparent from the following more particular description presented in connection with the accompanying drawings, in which.

DESCRIPTION OF THE PREFERRED EMBODIMENTS

Figure 1:
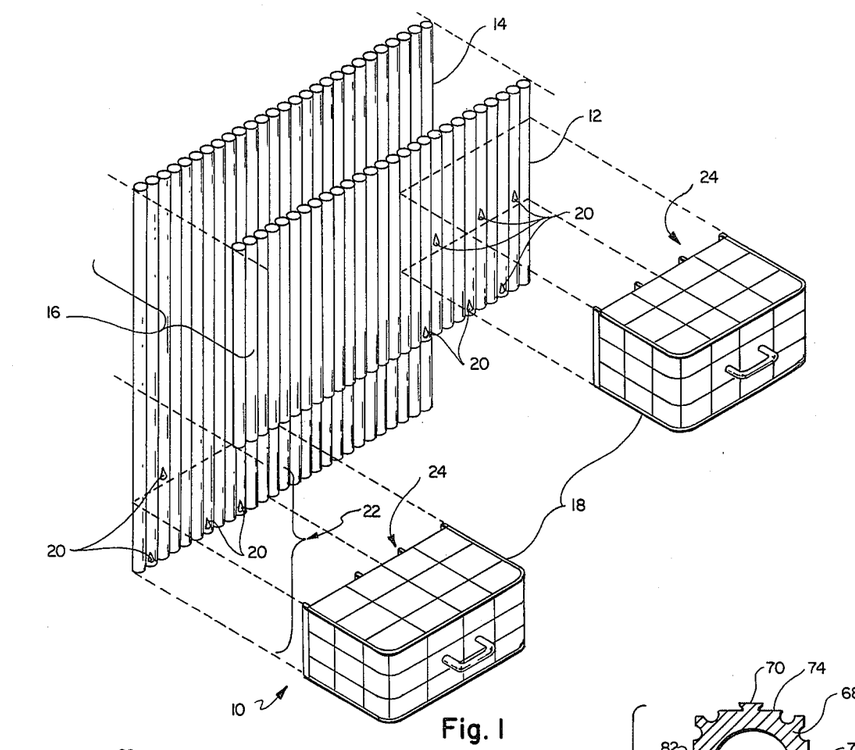
FIG. 1 is a perspective view showing, in disassembled form, how the basic elements of the invention fit together.

Referring first to FIG. 1, there is shown in disassembled form the basic elements that comprise a modular cage system 10, the subject of the present invention. As shown in FIG. 1, a first tier of feeding tubes 12 is adapted to be coupled to a second tier of feeding tubes 14. Once coupled together the two tiers of feeding tubes 14, comprise the backbone structure 16, which backbone structure provides the basic support structure of the modular cage system 10. Animal cages 18 are adapted to be detachably connected along a front face of the tier 12 and the tier 14. Feed openings 20 are selectively placed along the front face of both the tier 12 and the tier 14 so that at least one of these openings are accessible from within the cages 18 when the cages 18 are connected to the tiers 12 or 14. Note that the front face of the tier 14 includes only that portion 22 that protrudes below the tier 12.

The cages 18 include meshed walls through which oxygenated water may freely pass, and through which uneaten food and fecal material may easily fall, thereby preventing undesirable accumulations inside of the cages. The side 24 of the cages which is against the front face of the tiers 12 or 14 is open, thereby allowing access to the feed openings 20 of the tiers 12 and 14 from the inside of the cages when the cages are attached to the backbone structure 16. Thus, the front face of the feeding tube tiers 12 and 14 actually comprises one of the walls of the modular cages 18 when these cages are detachably connected to the tiers.

Associated with each of the feed openings 20 that are selectively placed along the front faces of the tiers 12 and 14 is a stopper or plug (not shown in FIG. 1). This stopper or plug, as will be discussed more fully below, serves to terminate the tube at a point just below the feed tube opening 20. Thus, when the modular cage system 10 is in place under water, and it is desired to direct food to an individual cage 18, or compartment thereof, all that need be done is to deposit the food in the top of a designated tube of a given tier of tubes, and the food will fall through the individual tube down to the plug or stopper that is immediately below the feed tube opening 20. At that point, the animal inside of the cage may pull the food from the tube, or the plug or stopper may be slanted so as to direct the food to fall into the caged area. In this fashion, controlled, individualized feeding is possible for each cage (or compartment thereof) that is used within the system.

Figure 2:
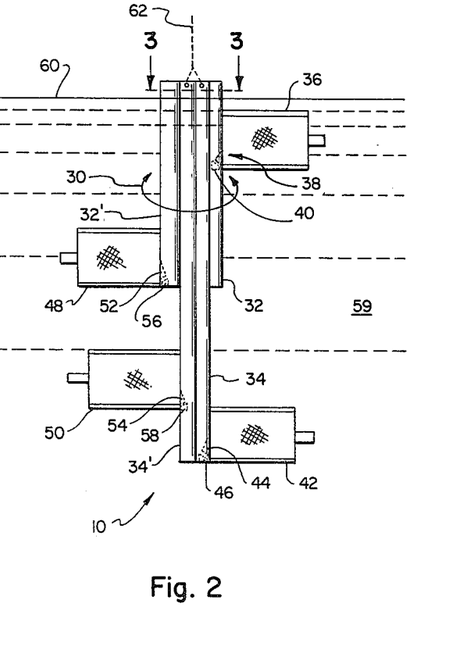
FIG. 2 is a side view of one embodiment of the invention showing two sets of vertical backbone structure joined back to back, thus enabling cages to be detachably connected to both sides of the joined structure.

Referring now to FIG. 2, there is shown a side view of one embodiment of the invention showing two sets of vertical support structure 16 that have been joined back to back to form a two sided backbone structure 30. This two sided backbone structure 30 consists of two first tiers of feeding tubes 32 and 32' and two second tiers of feeding tubes 34 and 34'. Note that the tiers 32 and 34 comprise a vertical support structure analogous to the vertical support structure 16 of FIG. 1, as do the tiers 32' and 34'. FIG. 2 shows the modular cages 18 connected to the front face of the two sided backbone structure. Thus, a cage 36 is attached to the front face of the tier 32. A feed tube opening 38 (analagous to the feed tube openings 20 of FIG. 1) is selectively placed along the front face of the tier 32 so as to open up to the inside of the cage 36. A stopper or plug 40 associated with the feed tube opening 38 is placed inside of the tube so as to be just below the feed tube opening. Note that the stopper or plug 40 has a slanted upper face that is oriented with respect to the feed tube opening 38 so that food deposited in the top end of the tube is forced to fall through the feed tube opening 38 into the bottom of the cage 36.

In a similar fashion, another modular cage 42 is attached along the front face of the tier 34. A feed tube opening 44 and associated plug or stopper 46 are selectively positioned in one of the tubes that comprise the tier 34 so as to direct food deposited into this tube into the cage 42.

Cages 48 and 50, with corresponding feed tube openings 52 and 54, as well as plug or stoppers 56 and 58 are employed in connection with the tiers 32' and 34' in the same manner as were the cages 36 and 42 in connection with the tiers 32 and 34. Note that the stopper or plug 56 shows an alternative embodiment which may be used. In this embodiment, the upper face of the stopper is not slanted. Therefore food deposited in such a tube would not necessarily fall into the cage, but would rather stop at the feed tube opening and would be accessible from within the cage. If this type of stopper is used, then the animal in the cage would have to reach through the feed tube opening in order to pull the food into the cage where the food could be consumed.

FIG. 2 also shows a method of employing the invention. The two sided backbone structure 30 may be supported in any suitable fashion so that it may be lowered vertically into the water 59. As shown in FIG. 2 the entire unit 10 is lowered beneath the surface of the water 60, so that only the top portion of the tiers of feeding tubes are visible above the water surface. Typically, a cable or chain 62 will be attached to the backbone structure 30 and supported by a suitable hoist (not shown), although any suitable support mechanism could be used that would facilitate the raising and lowering of the entire unit in and out of the water.

Figure 3:
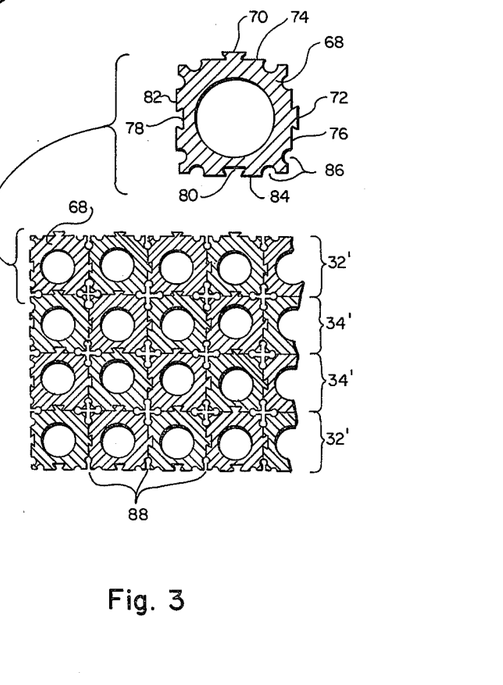
FIG. 3 shows a cross sectional view taken along the line 3—3 in FIG. 2.

Referring now to FIG. 3, there is shown a cross sectional view takenn along the line 3—3 of FIG. 2. FIG. 3 illustrates that each of the tiers of tubes, 32, 34, 34', and 32' comprise a plurality of individual tubes that are interlocked together in parallel fashion. Each tube of each tier has an identical cross section appearance, thus reference will be made to the exploded cross sectional view of one of these tubes (also shown in FIG. 3). Each tube has a cross sectional periphery that is essentially square-shaped, with a hollow channel on the inside that is basically circular. The preferred manner of constructing such tubes is to extrude them from PVC material in a single operation, although any suitable method of manufacture could be used.

As seen best in the exploded portion of FIG. 3, each of the extruded tubes contains flarred tenons 70 and 72 running lengthwise along two of its planar sides 74 and 76 respectively. Similarly, two flarred mortises 78 and 80 run lengthwise along the planar sides 82 and 84 respectively. Both the tenons and the mortises are substantially centered on their respective planar sides, thereby enabling a tenon from one extruded tube to interface with a mortise of another tube so as to create an interlocking dovetail-type joint.

Also included along the corner edges of each of the extruded tubes 68 is a pair of half channels or slots 86. These half channels or slots 86 are configured as shown in the drawing so that when adjacent tubes are interlocked together a complete channel or slot 88 is formed. It is these channels or slots 88 which provide the means for detachably connecting the cages to selected areas along the planar surfaces of each tier of feeding tubes.

With each tube 68 configured as shown in FIG. 3, there is no limit as to the number of tubes that may be placed in each tier. Thus, the individual tiers can be expanded in width as needed in order to handle the number of cages desired. Moreover, there is no limit (other than the depth of the available water) to the length of each of the individual tubes. Thus, the height of the tiers may be selected according to the depth of the water in which the modular cage system is to be kept. A typical configuration is to have the first tier of tubes 32 (or 32') be 5 feet high; with cages that are 6 inches. Thus, about ten levels of cages may be attached to the front face of the first tier. The second tier of tubes 34 (or 34') is typically made 10 feet high, thus providing an additional 5 feet of frontal space to which the 6 inch cages may be attached. Thus, a total of 20 levels of cages can be contained on each side of the vertical support structure that is constructed to these dimensions. (Note that the structure shown in FIG. 2 is not drawn to these proportions, but is rather drawn—for illustrative purposes only—so that three levels of cages may be attached to each tier.)

Figures 4A, 5:
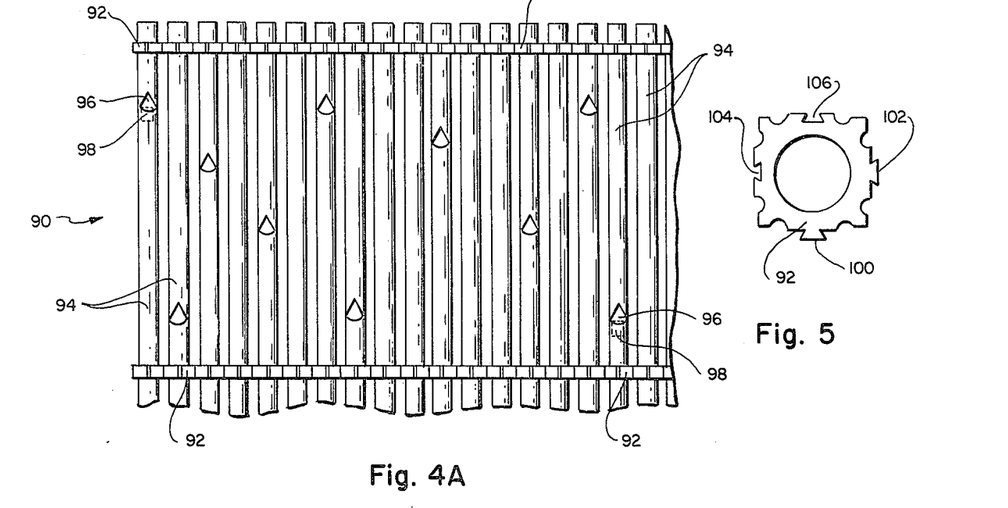
FIG. 4A is a front view of alternative embodiment of the invention wherein the vertical backbone structure comprises standard PVC pipe joined together by an interlocking individualized collar arrangement.
FIG. 5 shows a top view of one embodiment of the individualized interlocking collars used in FIG. 4A.
Figure 4B:
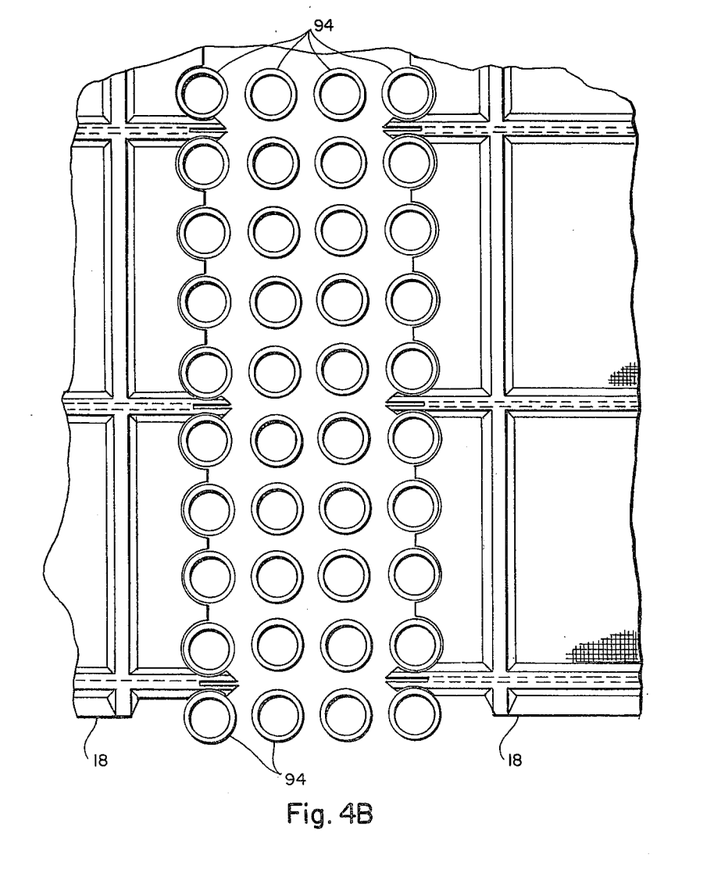
FIG. 4B is a top view of backbone structure to that shown in FIG. 4A and includes partial views of cages attached to the backbone structure.

FIG. 4A shows a front view of a tier of feeding tubes 90 that is fabricated according to alternative embodiment of the invention. In FIG. 4A, the individual tubes are made from standard PVC pipe that are joined together in tier fashion using some sort of interlocking collar arrangement. The interlocking collars 92 are slid over the individual PVC pipes 94 and positioned at a suitable location along the length thereof. Each PVC pipe 94 will require at least two collars 92 according to this embodiment of the invention. Once the collars have been placed on the individual PVC pipes, then the collar arrangements of each pipe may be interlocked to form a suitable tier of feeding tubes. A top view of such an arrangement, including a partial view of cages 18 attached thereto, is shown in FIG. 4B. Feed openings 96 can then be cut in each tube at selected locations along one side of the tier 90. Plugs or stoppers 98 can then be inserted in the tubes just below the cut feed opening. Note in FIG. 4A (as well as in FIG. 2) that the top end of each of the tubes 94 that are used in a given tier of feeding tubes are positioned so as to be substantially even with each other. This, of course, is to facilitate the placing of the tier of feeding tubes in the water so that all of the top ends of the feeding tubes may be conveniently held near, typically just above, the surface of the water. On the other hand, the bottom ends of the feeding tubes need not be even. For example, it would be possible to have tubes of several lengths within the same tier. Typically, however, all the tubes in a given tier will be of the same length to add structural strength.

FIG. 5 shows a top view of one embodiment of the collar 92 used in connection with the embodiment disclosed in FIG. 4A. The collar includes two tenons 100 and 102 and two mortises 104 and 106 each positioned on a different side of the collar 92. As with the extruded tubes discussed in connection with FIG. 3, the collar 92 of FIG. 5 has an outer periphery that is substantially square, and inside periphery that is circular and adapted to snuggly fit around the outside of the PVC pipes 94. With two tenons and mortises on each collar, as shown in FIG. 5, adjacent collars may be interlocked in a dovetail fashion, thereby allowing the individual tubes of each tier to be joined together, as well as allowing a first tier of such tubes to be interlocked to a second tier of tubes.

Figures 6, 7A:
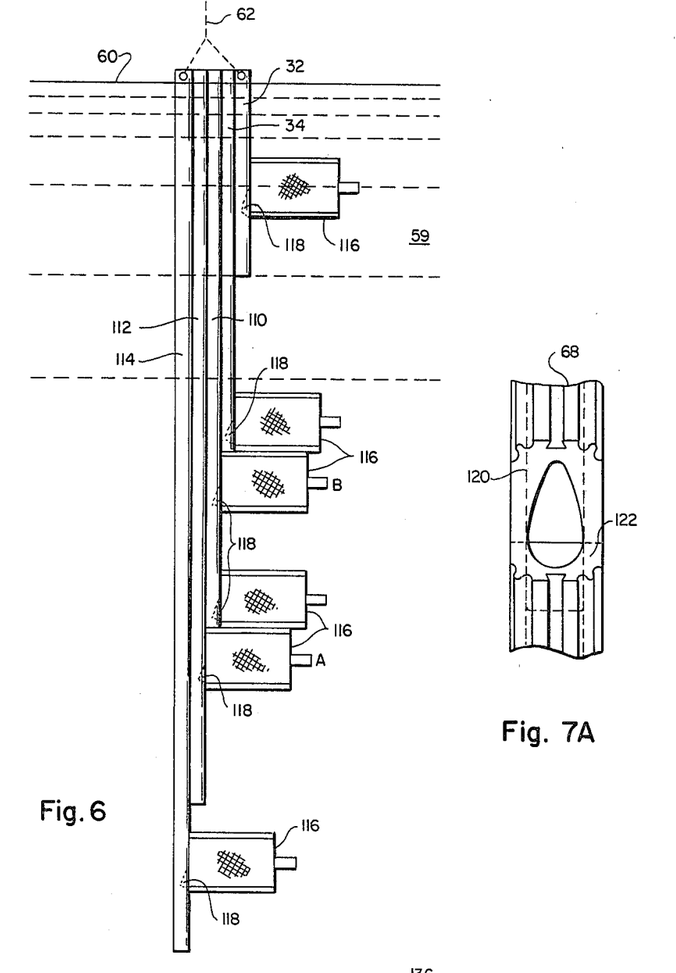
FIG. 6 illustrates a side view of the invention showing how additional tiers of feeding tubes, each having a successively longer length, can be added so as to increase the frontal area to which the cages may be attached.
FIGS. 7A and 7B show a front and side view respectively of the feed opening that is selectively employed in the feeding tubes of the tiers shown in FIGS. 2 and 3.

FIG. 6 illustrates how the basic support structure of the modular cage system may be expanded to include additional tiers of feeding tubes, each of a successively longer length, so as to provide more frontal space to which additional cages may be attached. Thus, in FIG. 6, which is a side view of the invention (much as is FIG. 2), a first tier of feeding tubes 32 is coupled to a second tier of feeding tubes 34, just as in FIG. 2. However, in order to expand the capacity of the support structure, a third tier of feeding tubes 110 is tied to the second tier of feeding tubes 34; a fourth tier of feeding tubes 112 is tied to the third tier of feeding tubes 110; and a fifth tier of feeding tubes 114 is tied to the fourth tier of feeding tubes 112. Cages 116 may be selectively attached to the frontal area created by any of the five tiers of feeding tubes. Feed openings 118 are selectively placed along the front side of each tier so that at least one feed opening opens up into each compartment of each cage, as previously described. Associated with each feed opening 118, there is an appropriate plug or stopper (not shown) to terminate the feed tube at a point just below where the feed opening is cut into the tube. The open ends of each of the feed tubes of each tier are positioned substantially even with each other. A suitable cable or chain 62 may then be attached to the support structure in any suitable fashion so that a hoisting mechanism may be used to lower the entire structure into the water 59, with only the upper open ends of the tubes being visible above or near the surface of the water 60.

Because of the successively longer lengths of tiered structure, the cages 116 detachably connected to the first tier of feeding tubes 32 protrude out farther horizontally than the cages attached to subsequent tiers of feeding tubes. Hence, the flow of oxygenated water through the systems can follow a path generally as shown by the arrows A—A and B—B in FIG. 6.

Figure 7B:
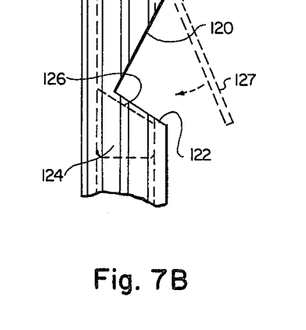

FIGS. 7A and 7B show more detail of the feed openings that are cut in the extruded tubes 68 that are employed in the preferred embodiment of the invention. The feed openings are most easily made by making two planar cuts 120 and 122, as shown best in FIG. 7B. The planar cut 122 is made so as to be more or less orthoginal with the planar cut 120. A stopper or plug 124 is used to terminate the tube 68 at a point just below the cut opening created by the planar cuts 120 and 122. As mentioned above, this stopper may have a slanted planar upper face 126 which will direct any food falling down the inside of the tube into the caged area. Also shown in FIG. 7B, in dotted lines, is a trap door 127. This door may optionally be used in connection with a feed opening to keep the opening closed except when it is desired to have food pass therethrough. A spring 128, or other biasing means, is used with the door 127 to keep it normally in the closed position. Any suitable mechanism may be used to overcome the force created by the spring or biasing means when it is desired to open the door 127. For example, a blast of compressed air could be sent down the tube from the upper open end thereof to both open the door 127 and to force any food in the tube out through the opening into the cage. (Note, the side walls of adjacent tubes would serve to close in those portions of the feed tube openings in the side of the tube 68.)

Figure 8:
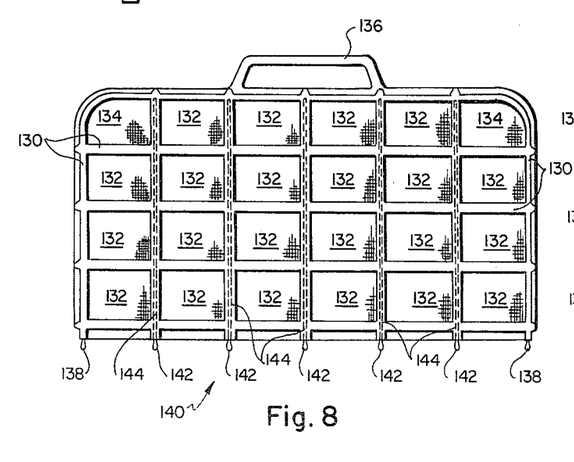
FIG. 8 shows a top view of the preferred embodiment of the modular cages that are used with the invention.
Figure 9:
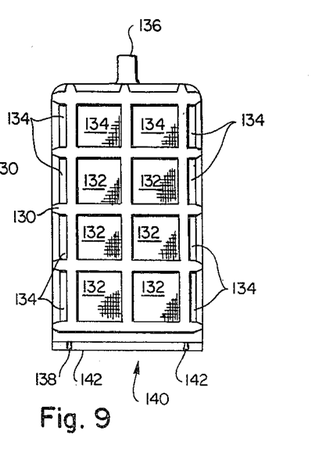
FIG. 9 is an end view of the cage shown in FIG. 8.

FIGS. 8 and 9 show a top and side view respectively of the preferred embodiment of the cages that are detachably connected to the vertical support structure. The cages consist of ribbed support structure 130 to which an appropriate meshed screen 132 can be attached. For structural strength, the corners are preferably closed in with a solid material 134, as opposed to the flexible mesh 132. This rigid material 134 is typically ⅛ inch thick clear plastic. The supporting ribs 130 are also, in the preferred embodiment, made from molded plastic. A handle 136 is provided to facilitate handling of the cage. It has been determined experimentaly by the inventors hereof that an ideal size for the openings in the mesh screen 132 is a 1 mm hole size. Such a size is large enough to allow fecal material and small bits of uneated food to pass through the cage without accummulation, yet it is large enough to allow a free flow of oxygenated water through the cage, as well as to keep larger portions of uneaten food from falling out of the cage.

One of the key elements of the cages shown in FIGS. 8 and 9 are the protruding ridges 138 that extend outwardly along the outter edges of the open side 140 (analogous to the open side 24 of the cages 18 of FIG. 1). Coupled with the protruding ridges 138 are protruding fingers 142. Both the ridges 138 and the fingers 142 are spaced apart from each other a specified distance so that they will interface with the groves or channels 88 that are formed when the extruded tubes 68 (or the collars 92) are interlocked together. In the preferred embodiment, the space between the ridges 138 and/or fingers 142 is equal the width of four extruded tubes 68 which are interlocked together. The width of the ridges 138 and/or the fingers 142 is such that they may be forceably inserted into the channels or groves 88 by an average adult person. Once thus inserted, the cage is firmly locked in place and cannot be moved unless one firmly grasps the handle 136 and disengages the cage from the tier to which it has been attached.

Included as part of the ribbed structure 130 that runs across the shortest dimension of the top and bottom of the cages is a grove or channel 144. This grove or channel 144 opens up to the inside of the cage and provides a means for inserting a wall or divider into the cage so as to divide and separate the cage into compartments. By inserting dividers or walls into these channels 144, it is possible to divide the cage shown in FIGS. 8 and 9 into as many as six compartments, thereby allowing as many as six different animals to be housed in each cage. As the animals grow in size, the dividers can be slid out from the cage, thereby increasing the size of the cage for the animal as it grows so as to not stunt its growth.

In operation, the modular cage system that is the subject of the present invention is used basically as follows: First, a suitable vertical support structure is configured by joining together two or more tiers of feeding tubes. Feed openings are selectively cut (or have previously been cut) along the front faces of these tiers of feeding tubes so that at least one feed opening will be accessible from each compartment of each cage. Animals are then placed in cages similar to those shown in FIGS. 8 and 9. Large animals may require an entire cage to themselves, while smaller animals may only require one compartment of a cage. The cages are then detachably connected to the front face of the vertical support structure. The entire unit is then hoisted into the water so that the open top ends of the feeding tubes of each tier are accessible from above the water surface line. At regular intervals, food is deposited in each tube of each tier. The food used is typically in pellet form, and thus can be selectively composed of any suitable materials in any composition so as to maximize the animal's growth. The tubes may be identified, either through the use of labels or a recognized pattern, so that the person feeding the animals knows exactly to which cage (or compartment thereof) the food dropped in each tube is going. In this fashion, a very controlled environment is created for the animal in the cage, it being able to feed only on the amount of food and the type of food that the person using the caged structure desires it to receive at prescribed intervals.

At less frequent intervals, the modular caged unit may be hoisted out of the water and inspected. The inspection will typically look for dead animals, for accummulations of undesirable fecal material or uneaten food. During this inspection time, the cages may also be rearranged as needed. For example, it may be necessary to increase the size of the compartments where some previously smaller animal had been located. This is easily done by snapping the cage out of the vertical support structure, removing some of the smaller animals therefrom, sliding some of the dividing walls out of the cage so as to increase the compartment's size for the animals remaining, and snapping the cage back in the support structure. As this is done, the person raising the animals makes appropriate changes in his records so that he will know that only one animal is now being housed where two animals previously were housed. Accordingly, only one of the tubes which directs food into what was previously two compartments will subsequently be used to feed that animal.

At the inspection time it may also be desirable to expand the housing structure by either adding additional tubes to each tier, so as to increase their width, or by adding additional tiers of feeding tubes of successively longer lengths to the already existing tiers of feeding tubes.

In the fashion described above, a highly controlled housing structure is provided for raising underwater animals. The structure is ideally suited for optimum use of available underwater area, and allows for the efficient feeding and controlling of the animals as they grow.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. An aquatic vertical housing and feeding structure comprising:

vertical backbone structure including
  (1) a plurality of tiers of feeding tubes, each of said tiers having a successively increasing vertical length such that the lower end of a second tier protrudes a substantial distance below the lower end of a first tier, a third tier protrudes a substantial distance below said second tier, and so on, when the upper ends of said tiers are positioned substantially even with each other, each of said tiers of feeding tubes comprising:
    (a) a plurality of substantially vertical feeding tubes,
    (b) holding and spacing means for rigidly connecting said tubes side-by-side in a parallel, single row, spaced-apart relationship wherein the upper ends of said tubes are positioned so as to be substantially even with each other,
    (c) each of said feeding tubes having an open top end, a feed opening selectively placed along the length thereof, said opening being accessible from an exposed front side of said tier, and plug means for selectively closing said tube immediately below said feed opening, and
  (2) connecting means for rigidly connecting said tiers of feeding tubes in a parallel spacedapart relationship that causes front sides of each tier to face in the same direction and that positions the upper ends of said tiers so as to be substantially even with each other;

a plurality of cages, each of said cages being selectively dividable into a plurality of caged compartments, each of said compartments being adapted to house an underwater animal;

cage connecting means for allowing said cages to be detachably secured to selected areas along the exposed front sides of said tiers, said selected areas allowing at least one of said feed openings to be accessible from within each cage compartment; and support means for vertically suspending said backbone structure, including the cages detachably secured thereto, in water such that all but the upper ends of said feeding tubes of each of said tiers of feeding tubes are held under water;

whereby food may be individually and controllably delivered through a respective feeding tube to each underwater cage compartment from a location above water.

2. An aquatic vertical housing and feeding structure as defined in claim 1 further including second backbone structure the same as said first backbone structure, said second backbone structure having a back side that is detachably coupled to a back side of said first backbone structure, thereby creating combined backbone structure to which said cages may be detachably connected on both sides thereof.

3. An aquatic vertical housing and feeding structure as defined in claim 1 wherein said holding and spacing means for connecting said feeding tubes of each tier in a parallel spaced-apart relationship and said connecting means for connecting said tiers in a parallel spaced-apart relationship comprise a plurality of horizontal collar bands that are selectively positioned vertically along said backbone structure, each of said collar bands serving to rigidly position and connect adjacent tubes of the same tier and of adjacent tiers in a parallel spaced-apart relationship.

4. An aquatic vertical housing and feeding structure as defined in claim 3 wherein each of said cases further comprises a cage structure having a planar front side, a planar top, a planar bottom, and appropriate side walls enclosing said cage structure; said side walls, planar top, and planar bottom, having perforations therein adapted to allow air and water to freely pass therethrough, said cage structure being adapted to be detachably connected to said exposed front side of said tiers of feeding tubes in an orientation that places said planar front side of said cage structure against said tier, said front planar side having at least a portion thereof open that permits food material placed in said tubes to be accessible through said feed openings of said tubes into each caged compartment of said cage structure.

5. An aquatic vertical housing and feeding structure as defined in claim 4 wherein said cage structure further includes a handle connected to a side wall opposite said front planar side, said handle serving to facilitate the insertion and removal of said cage structure along said front side of said tiers of feeding tubes as well as to facilitate the handling of said cage structure when not connected to said tier.

6. An aquatic vertical housing and feeding structure as defined in claim 3 wherein each of said tubes further comprises a trap door covering said feed opening.

7. An aquatic vertical housing and feeding structure as defined in claim 6 wherein said trap door includes biasing means for keeping it in its closed position.

8. An aquatic vertical housing and feeding structure as defined in claim 3 wherein said cage connecting means includes:
(a) a plurality of spaced-apart protruding ridges extending outwardly along at least one edge of each of said cages; and
(b) means along said exposed front face of said tiers of feeding tubes for grasping hold of said ridges, thereby allowing said cages to be detachably connected along the exposed front face of said tiers of feeding tubes.

9. An aquatic vertical housing and feeding structure as defined in claim 8 wherein said grasping means for grasping hold of said ridges comprises
(a) making said protruding ridges slightly wider than the open space between adjacent feeding tubes,
(b) placing a longitudinal slot in each of said ridges and making said ridges from a stiff resilient material, the presence of said slot allowing the sides of said ridges on opposite sides of said slot be be pressed together by external forces, and forcing said ridges inbetween adjacent feeding tubes.

10. An aquatic vertical housing and feeding structure as defined in claim 3 wherein said collar bands comprise individual collars for each tube that are adapted to be detachably secured to each other.

11. An aquatic vertical housing and feeding structure as defined in claim 10 wherein said individual collars include an inside surface contoured to tightly fit over said tubes, and further include an outter perimeter that has side planar edges adapted to detachably interlock with the side planar edges of other of said collars which are slipped over adjacent tubes.

12. An aquatic vertical housing and feeding structure as defined in claim 11 wherein a first of said side planar edges of said collars includes a tenon protruding therefrom and a second of said side planar edges includes a mortise indented therein into which said tenon from said first side planar edge of an adjoining collar may be inserted.

13. An aquatic vertical housing and feeding structure as defined in claim 12 wherein said tenon and mortise are flarred so as to create an interlocking dovetail joint between adjoining collars.

14. A method of constructing an aquatic vertical housing and feeding structure comprising the following steps and variations in the order thereof:
(a) tiering together a first plurality of feeding tubes, each having an open top end, in substantially parallel fashion, said tubes being oriented so that said top ends are substantially even with a top line normal to a longitudinal axis of each tube, thereby creating a first tier of feeding tubes;
(b) tiering together a second plurality of feeding tubes, each having an open top end, in parallel fashion, said tubes being oriented so that said top ends are substantially even with a top line normal to a longitudinal axis of each tube, each of said second plurality of tubes having a longer length than the longest of said first plurality of tubes, thereby creating a second tier of feeding tubes having a longer length than said first tier of feeding tubes;
(c) coupling said first tier of feeding tubes to said second tier of feeding tubes in an orientation that places said top ends of said tubes in both said first and second tiers substantially even with each other, and which further points a front face of each of said tiers in the same direction;
(d) detachably connecting a plurality of cages, each having a plurality of caged compartments therein, to exposed areas along said front faces of said first and second tiers;
(e) creating a feed opening along said front face of selected tubes of said tiers that is assessible from the inside of each of said caged compartments of said cages; and
(f) blocking each of said tubes at a point immediately below each of said openings.

15. A method of constructing an aquatic vertical housing and feeding structure as defined in claim 14 further including the step of:
(g) constructing additional tiers of feeding tubes as described in steps (a) and (b) and attaching said additional tiers to previously constructed tiers according to the manner described in step (c), each of said additional tiers being of successively longer length, thereby providing additional frontal area protruding below said previously constructed tiers to which said plurality of cages may be detachably connected.

* * * * *

UNITED STATES PATENT AND TRADEMARK OFFICE
CERTIFICATE OF CORRECTION

PATENT NO. : 4,337,727

DATED : July 6, 1982

INVENTOR(S) : Roger W. Mickelsen, Rex C. Infanger, Richard A. Heckman

It is certified that error appears in the above—identified patent and that said Letters Patent is hereby corrected as shown below:

On the Title page Item [76] Inventors, add a fourth inventor as follows:

--Dee R. Taylor, 1385 East Oakcrest Lane, Provo, Utah 84601--.

Signed and Sealed this

Fifth Day of October 1982

[SEAL]

Attest:

GERALD J. MOSSINGHOFF

Attesting Officer

Commissioner of Patents and Trademarks